US010343386B2

(12) United States Patent
Lee et al.

(10) Patent No.: US 10,343,386 B2
(45) Date of Patent: Jul. 9, 2019

(54) APPARATUS AND METHOD FOR SIMULTANEOUSLY PERFORMING DELAMINATION AND ADHESION PROCESSES

(71) Applicant: DONGWOO FINE-CHEM CO., LTD., Iksan-si, Jeollabuk-do (KR)

(72) Inventors: Myeong Won Lee, Incheon (KR); Young Kyun Hong, Seoul (KR); Ki Wan Kim, Sejong-si (KR)

(73) Assignee: Dongwoo Fine-Chem Co., Ltd., Jeollabuk-Do (KR)

( * ) Notice: Subject to any disclaimer, the term of this patent is extended or adjusted under 35 U.S.C. 154(b) by 18 days.

(21) Appl. No.: 15/887,038

(22) Filed: Feb. 2, 2018

(65) Prior Publication Data

US 2018/0222175 A1    Aug. 9, 2018

(30) Foreign Application Priority Data

Feb. 3, 2017    (KR) .................. 10-2017-0015330

(51) Int. Cl.
*B32B 43/00*    (2006.01)
*B32B 37/00*    (2006.01)
(Continued)

(52) U.S. Cl.
CPC .......... *B32B 43/006* (2013.01); *B32B 37/025* (2013.01); *B32B 37/12* (2013.01);
(Continued)

(58) Field of Classification Search
CPC . B32B 38/10; B32B 43/006; Y10T 156/1052; Y10T 156/1132;
(Continued)

(56) References Cited

U.S. PATENT DOCUMENTS 9,731,492 B2 * 8/2017 Lee ..................... B32B 43/006
2015/0122427 A1 * 5/2015 Koo ..................... B32B 43/006
156/707

FOREIGN PATENT DOCUMENTS

JP    2012171032 A    9/2012
KR    1020070031797 A    3/2007
(Continued)

OTHER PUBLICATIONS

Translation of KENGO (JP 2012 171032) (Year: 2012).*
Office Action, Korean Patent Application No. 10-2017-0015330, dated Sep. 5, 2017.

*Primary Examiner* — Mark A Osele
*Assistant Examiner* — Nickolas R Harm
(74) *Attorney, Agent, or Firm* — DLA Piper LLP (US)

(57) ABSTRACT

The present invention relates to an apparatus and a method for simultaneously performing delamination and adhesion processes. The apparatus which simultaneously performs delamination and adhesion processes includes: a lower stage configured to suction and fix a carrier substrate on which a first workpiece is adhered; and an upper stage including a curved main body configured to suction and fix a second workpiece and formed in a shape convex toward the first workpiece, and a driving portion configured to rotate the curved main body such that predetermined portions of the second workpiece sequentially come into contact with corresponding predetermined portions of the first workpiece at a predetermined pressure, adhere the second workpiece to the first workpiece, and delaminate the first workpiece from the carrier substrate during an adhesion process. According to the present invention, the required number of detailed processes and a process time are decreased, a yield is increased, and deformation of a workpiece due to a residual stress generated during the adhesion and delamination pro-
(Continued)

cesses is minimized by the adhesion and delamination processes being performed simultaneously.

9 Claims, 16 Drawing Sheets

(51) Int. Cl.
*B32B 37/14* (2006.01)
*B32B 38/10* (2006.01)
*B32B 37/12* (2006.01)

(52) U.S. Cl.
CPC .............. *B32B 37/14* (2013.01); *B32B 38/10* (2013.01); *B32B 2457/20* (2013.01); *Y10T 156/1052* (2015.01); *Y10T 156/1132* (2015.01); *Y10T 156/1168* (2015.01); *Y10T 156/1944* (2015.01); *Y10T 156/1978* (2015.01)

(58) Field of Classification Search
CPC ......... Y10T 156/1168; Y10T 156/1944; Y10T 156/1978
USPC ....... 156/152, 247, 249, 285, 297, 707, 714, 156/715, 582, 758, 764, 760
See application file for complete search history.

(56) References Cited

FOREIGN PATENT DOCUMENTS

| KR | 1020100070730 A | 6/2010 |
|---|---|---|
| KR | 1020150051280 A | 5/2015 |

\* cited by examiner

1

APPARATUS AND METHOD FOR SIMULTANEOUSLY PERFORMING DELAMINATION AND ADHESION PROCESSES

CROSS-REFERENCE TO RELATED PATENT APPLICATION

This U.S. non-provisional patent application claims priority under 35 U.S.C. § 119 of Korean Patent Application No. 10-2017-0015330 filed on Feb. 3, 2017 in the Korean Patent Office, the entire contents of which are hereby incorporated by reference.

FIELD OF INVENTION

The present invention relates to an apparatus and a method for simultaneously performing delamination and adhesion processes. More particularly, the present invention relates to an apparatus and a method for simultaneously performing delamination and adhesion processes in which the required number of detailed processes and a process time are decreased, a yield is increased, and deformation of a workpiece due to a residual stress generated during the adhesion and delamination processes is minimized by simultaneously performing the adhesion and delamination processes.

BACKGROUND

Generally, in a process in which a flexible display device and the like are manufactured, a method in which components of the device are formed on a carrier substrate or process substrate using adhesion and the like and the corresponding device is delaminated from the rigid substrate is used.

FIGS. 1 to 3 are views for describing a method of adhering a color filter to a display panel and the like according to a conventional art.

Referring to FIG. 1, a separating layer for delaminating a color filter from a glass substrate is formed on the glass substrate, the color filter is formed on the separating layer, and an organic light-emitting diode (OLED) or thin-film transistor (TFT) is additionally adhered to an optically clear adhesive (OCA) film.

Next, referring to FIG. 2, a process of adhering the OCA film to the color filter is performed.

Next, a process of separating the glass substrate from the separating layer is performed through delamination.

According to the above-described conventional process, since the delamination and adhesion processes are performed as separate processes, there are problems in that a yield decreases in addition to the number of required processes being large and a process time becoming longer.

In addition, there is a problem in that a considerable level of deformation of a workpiece occurs due to a residual stress generated in the adhesion and delamination processes.

PRIOR-ART DOCUMENTS

Patent Documents

Korean Laid-open Patent No. 10-2010-0070730 (Publication Date: Jun. 28, 2010, Title: Method of Manufacturing Flexible Display Device)

SUMMARY OF THE INVENTION

Technical Problem

A technical objective of the present invention is to provide an apparatus and a method for simultaneously performing delamination and adhesion processes, which are capable of decreasing the required number of detailed processes and a process time and increasing a yield when compared to a conventional method of separately performing the adhesion and delamination processes by simultaneously performing the adhesion and delamination processes.

In addition, a technical objective of the present invention is to provide an apparatus and a method for simultaneously performing delamination and adhesion processes, which are capable of minimizing deformation of a workpiece due to a residual stress generated during the adhesion and delamination processes.

Solution to Problem

An apparatus for simultaneously performing delamination and adhesion processes according to the present invention includes: a lower stage configured to suction and fix a carrier substrate on which a first workpiece is adhered; and an upper stage including a curved main body configured to suction and fix a second workpiece and formed in a shape convex toward the first workpiece, and a driving portion configured to rotate the curved main body such that predetermined portions of the second workpiece sequentially come into contact with corresponding predetermined portions of the first workpiece at a predetermined pressure, adhere the second workpiece to the first workpiece, and delaminate the first workpiece from the carrier substrate during an adhesion process.

In the apparatus for simultaneously performing delamination and adhesion processes according to the present invention, after an adhered laminate is formed by adhering the second workpiece to the first workpiece, the adhered laminate may be adsorbed on a curved surface of the curved main body.

In the apparatus for simultaneously performing delamination and adhesion processes according to the present invention, immediately after the adhered laminate is adsorbed on the curved surface of the curved main body, the curved main body may be rotated in a direction opposite a rotational direction of the curved main body during the adhesion process such that the adhered laminate sequentially comes into contact with the carrier substrate at a predetermined pressure at the same time that an adsorption force of the curved surface is decreased to stack the adhered laminate on the carrier substrate.

In the apparatus for simultaneously performing delamination and adhesion processes according to the present invention, at least one of the first workpiece and the second workpiece may include a surface having an adhesive force and located opposite a suction surface.

In the apparatus for simultaneously performing delamination and adhesion processes according to the present invention, an upper suction force by which the upper stage suctions the second workpiece may be stronger than a lower suction force by which the lower stage suctions the first workpiece.

In the apparatus for simultaneously performing delamination and adhesion processes according to the present invention, the upper suction force by which the upper stage suctions the second workpiece may be stronger than a lower suction force by which the lower stage suctions the first workpiece, at least one of the first workpiece and the second workpiece may include a surface having an adhesive force and located opposite the suction surface, and the adhesive force between the first workpiece and the second workpiece may be stronger than the upper suction force and the lower suction force.

In the apparatus for simultaneously performing delamination and adhesion processes according to the present invention, the upper suction force may be stronger than the adhesive force between the carrier substrate and the first workpiece.

In the apparatus for simultaneously performing delamination and adhesion processes according to the present invention, the upper stage may suction the second workpiece using the upper suction force, which is provided through upper stage holes formed in the curved main body, and fix the second workpiece on the curved surface of the curved main body, and among the upper stage holes, each diameter of first upper stage holes formed in an adhesion start region at which adhesion of the second workpiece to the first workpiece starts may be stronger than that of second upper stage holes formed in a region other than the adhesion start region.

In the apparatus for simultaneously performing delamination and adhesion processes according to the present invention, the upper stage may suction the second workpiece using the upper suction force, which is provided through upper stage holes formed in the curved main body, and fix the second workpiece on the curved surface of the curved main body, and among the upper stage holes, a density of first upper stage holes formed in an adhesion start region at which adhesion of the second workpiece to the first workpiece starts may be stronger than that of second upper stage holes formed in a region other than the adhesion start region.

In the apparatus for simultaneously performing delamination and adhesion processes according to the present invention, the upper stage may suction the second workpiece using the upper suction force, which is provided through upper stage holes formed in the curved main body, and fix the second workpiece on the curved surface of the curved main body, and among the upper stage holes, each diameter or a density of first upper stage holes formed in an adhesion start region at which adhesion of the second workpiece to the first workpiece starts may be stronger than that of second upper stage holes formed in a region other than the adhesion start region.

In the apparatus for simultaneously performing delamination and adhesion processes according to the present invention, the upper stage may suction the second workpiece using the upper suction force, which is provided through upper stage holes formed in the curved main body, and fix the second workpiece on the curved surface of the curved main body, and each diameter of upper stage holes in an adhesion start region at which adhesion of the second workpiece to the first workpiece starts may be stronger than that of upper stage holes in an adhesion completion region at which the adhesion of the second workpiece to the first workpiece is completed.

In the apparatus for simultaneously performing delamination and adhesion processes according to the present invention, the upper stage may suction the second workpiece using the upper suction force, which is provided through upper stage holes formed in the curved main body, and fix the second workpiece on the curved surface of the curved main body, and a density of upper stage holes in an adhesion start region at which adhesion of the second workpiece to the first workpiece starts may be stronger than that of upper stage holes in an adhesion completion region at which the adhesion of the second workpiece to the first workpiece is completed.

In the apparatus for simultaneously performing delamination and adhesion processes according to the present invention, the upper stage may suction the second workpiece using the upper suction force, which is provided through upper stage holes formed in the curved main body, and fix the second workpiece on the curved surface of the curved main body, and each diameter or a density of upper stage holes in an adhesion start region at which adhesion of the second workpiece to the first workpiece starts may be stronger than that of upper stage holes in an adhesion completion region at which the adhesion of the second workpiece to the first workpiece is completed.

In the apparatus for simultaneously performing delamination and adhesion processes according to the present invention, the first workpiece may include a color filter, and the second workpiece may include a protective film.

In the apparatus for simultaneously performing delamination and adhesion processes according to the present invention, the second workpiece may include an optically clear adhesive (OCA) film.

In the apparatus for simultaneously performing delamination and adhesion processes according to the present invention, the second workpiece may be formed on a flexible substrate having ductility or a glass substrate.

In the apparatus for simultaneously performing delamination and adhesion processes according to the present invention, a pre-scribing process is performed on four corner regions of the first workpiece which is adhered on the carrier substrate and is a target of delamination and adhesion processes.

In the apparatus for simultaneously performing delamination and adhesion processes according to the present invention, a protective layer may be optionally formed on the first workpiece according to a material of the carrier substrate.

A method of simultaneously performing delamination and adhesion processes according to the present invention includes: rotating a curved main body by a driving portion of an upper stage such that predetermined portions of a second workpiece suctioned on a curved surface of the curved main body sequentially comes into contact with and press corresponding predetermined portions of a first workpiece adhered on a carrier substrate at a predetermined pressure to simultaneously adhere the second workpiece to the first workpiece and delaminate the first workpiece from the carrier substrate; and rotating the curved main body in a direction opposite a rotational direction of the curved main body during an adhesion process such that an adhered laminate including the first workpiece and the second workpiece sequentially comes into contact with the carrier substrate at a predetermined pressure at the same time that an adsorption force of the curved surface is decreased to stack the adhered laminate on the carrier substrate immediately after the adhered laminate is adsorbed on the curved surface of the curved main body.

Advantageous Effects

According to the present invention, there are advantageous effects of providing an apparatus and a method for simultaneously performing delamination and adhesion processes, which are capable of decreasing the required number of detailed processes and a process time and increasing a yield in comparison to a conventional process of separately performing the adhesion and delamination processes due to the adhesion and delamination processes being performed simultaneously.

In addition, there is an advantageous effect of proving an apparatus and a method for simultaneously performing delamination and adhesion processes, which are capable of minimizing deformation of a workpiece due to a residual stress generated during adhesion and delamination processes.

DETAILED DESCRIPTION OF THE INVENTION

Figure 1:
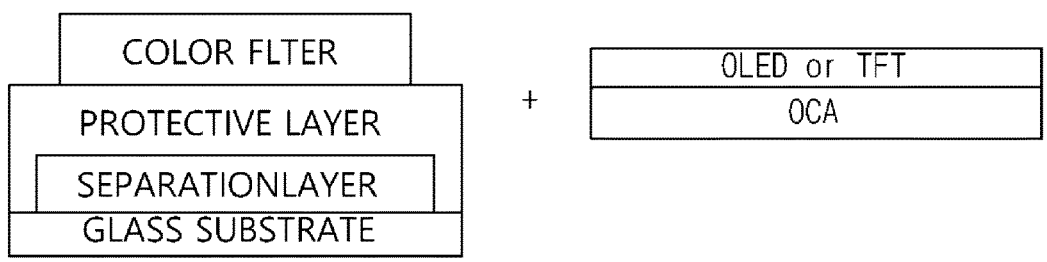
FIGS. 1 to 3 are views for describing a method of adhering a color filter to a display panel and the like according to a conventional art.
Figure 2:
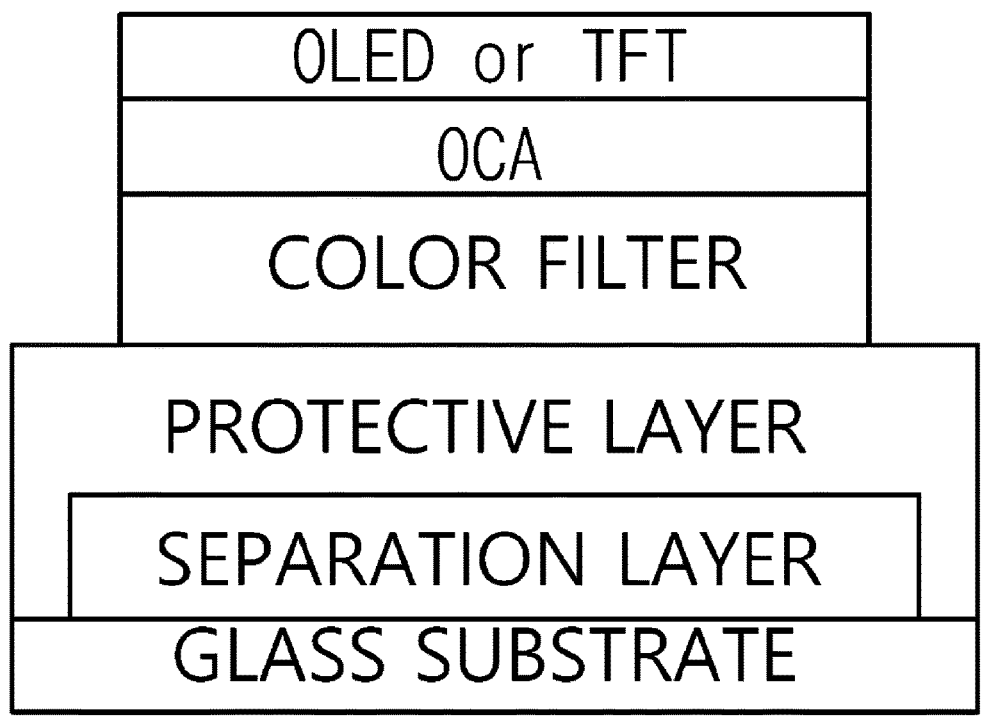
Figure 3:
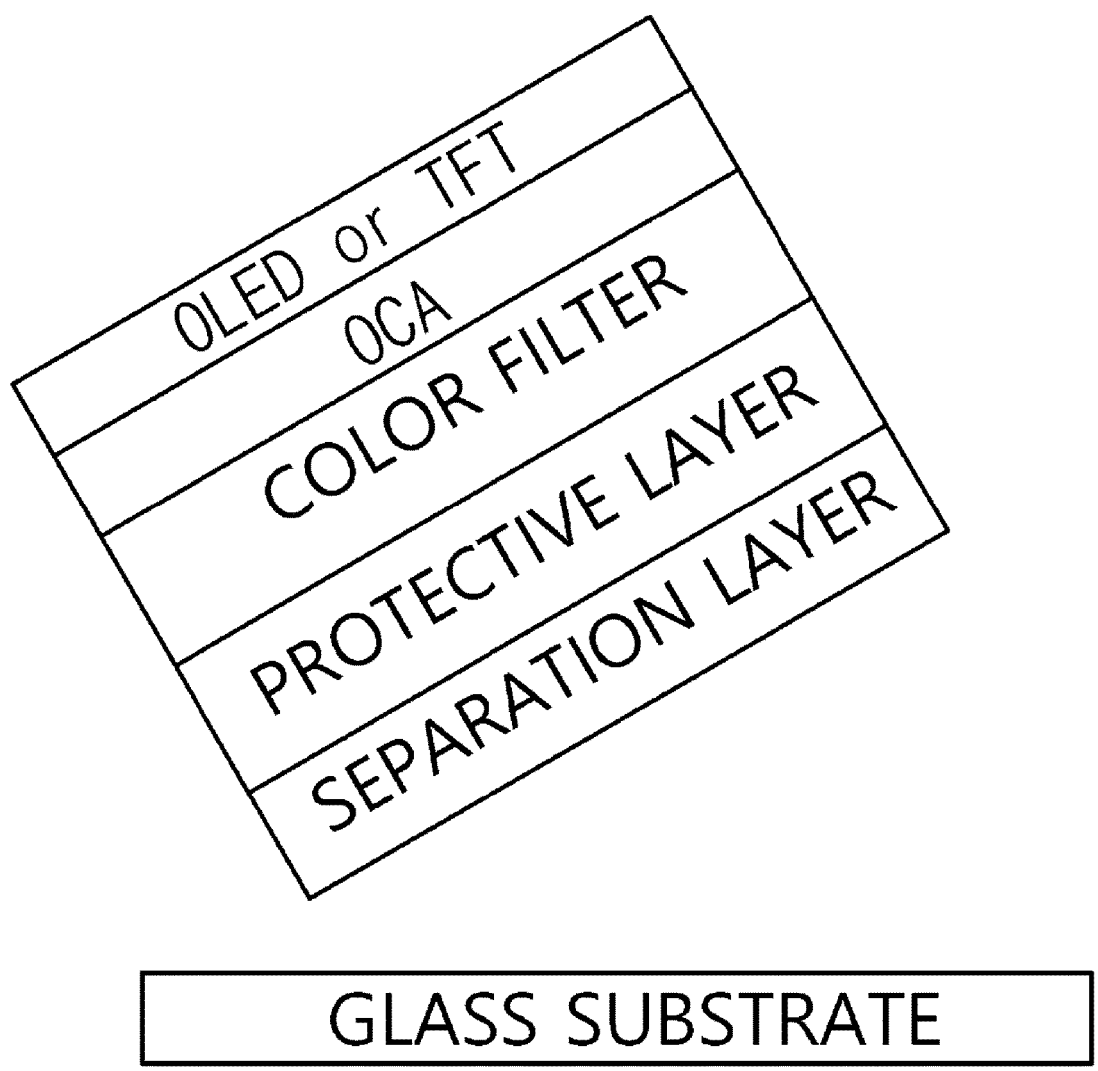

In embodiments according to the concept of the present invention disclosed in the specification, specific structural and functional descriptions are directed only to providing examples for describing the embodiments of the present invention, and the embodiments according to the concept of the present invention may be implemented in various forms, and the present invention is not limited to the embodiments described in the specification.

While the embodiments according to the concept of the present invention may be modified in various ways and have various alternative forms, examples of the embodiments are shown in the drawings and described in detail below. There is no intent to limit the present invention to the particular forms disclosed. On the contrary, the present invention covers all modifications, equivalents, and alternatives falling within the spirit and scope of the present invention.

It should be understood that, although the terms first, second, and the like may be used herein in reference to elements of the present invention, such elements are not to be construed as limited by the terms. The terms are only used to distinguish one element from another. For example, a first element could be termed a second element, and a second element could be termed a first element without departing from the scope of the present invention.

It should be understood that, when an element is referred to as being "connected" or "coupled" to another element, the element may be directly connected or coupled to the other element, or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," and the like).

The terminology used herein to describe the embodiments of the present invention is not intended to limit the scope of the present invention. The articles "a," "an," and "the" are singular in that they have a single referent, however the use of the singular form in the present document does not preclude the presence of more than one referent. In other words, elements of the present invention referred to in the singular may number one or more unless the context clearly indicates otherwise. It should be further understood that the terms "comprise," "comprising," "include," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein should be interpreted as is customary in the art to which the present invention belongs. It should be further understood that terms in common usage should also be interpreted as is customary in the relevant art and not in an idealized or overly formal sense unless expressly so defined herein.

Hereinafter, exemplary embodiments of the present invention will be described in detail below with reference to the accompanying drawings.

Figure 4:
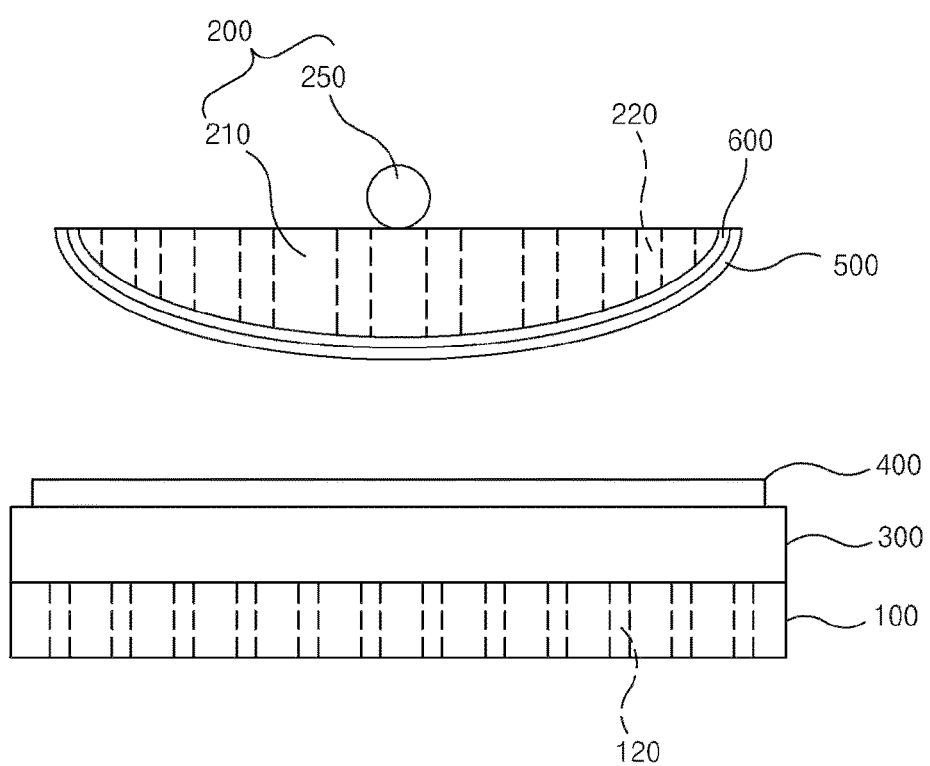
FIG. 4 is a view illustrating an apparatus which simultaneously performs delamination and adhesion processes according to one embodiment of the present invention.

FIG. 4 is a view illustrating an apparatus which simultaneously performs delamination and adhesion processes according to one embodiment of the present invention.

Referring to FIG. 4, the apparatus which simultaneously performs delamination and adhesion processes according to one embodiment of the present invention includes a lower stage 100 and an upper stage 200.

The lower stage 100 fixes a carrier substrate 300 on which a first workpiece 400, which is a target of delamination and adhesion, is adhered by, for example, suctioning the carrier substrate 300 using air pressure. The method of fixing the carrier substrate 300 to the lower stage 100 is not limited thereto, and a general fixing method using an adhesive force and the like may be used in the fixing.

For example, the lower stage 100 configured to suction and fix the carrier substrate 300 may include a plurality of lower stage holes 120, and the carrier substrate 300 may be suctioned by a pressure provided through the lower stage holes 120 and fixed to the lower stage 100. The pressure provided through the lower stage holes 120 is defined as a lower suction force.

For example, the first workpiece 400 may be a color filter, but is not limited thereto. In addition, for example, a second workpiece 500 may be a protective film, but is not limited thereto. More specifically, the second workpiece 500 may be an optically clear adhesive (OCA) film. In addition, the first workpiece 400 and the second workpiece 500 may be arbitrary structures which need delamination and adhesion processes to be coupled to each other. In addition, for example, the second workpiece 500 may be formed on a flexible substrate 600 having ductility or a glass substrate. In addition, for example, a protective layer may be optionally formed on the first workpiece 400 according to a material of the carrier substrate 300, and a glass material, a plastic material, a flexible material, or the like may be applied as the carrier substrate 300.

The upper stage 200 simultaneously performs delamination and adhesion processes by interacting with the lower stage 100 and includes a curved main body 210 and a driving portion 250.

The curved main body 210 suctions and fixes the second workpiece 500 configured to be adhered to the first workpiece 400, and is formed to have a curved shape convex toward the first workpiece 400.

For example, a plurality of upper stage holes 220 may be provided in the curved main body 210 configured to suction and fix the second workpiece 500 formed on the flexible substrate 600, and the second workpiece 500 may be suctioned by a pressure provided through the upper stage holes 220 and fixed to the curved main body 210. The pressure provided through the upper stage holes 220 is defined as an upper suction force.

The driving portion 250 rotates the curved main body 210 such that the second workpiece 500 is rolled on and pressed against the first workpiece 400 to simultaneously adhere the second workpiece 500 to the first workpiece 400 and delaminate the first workpiece 400 from the carrier substrate 300 during the adhesion and delamination processes.

For example, the upper suction force of the upper stage 200 for suctioning the second workpiece 500 is stronger than the lower suction force of the lower stage 100 for suctioning the first workpiece 400 and an adhesive force between the carrier substrate 300 and the first workpiece 400, at least one of the first workpiece 400 and the second workpiece 500 may include a surface which has an adhesive force and is opposite a suction surface, and an adhesive force between the first workpiece 400 and the second workpiece 500 may be stronger than the upper suction force and the lower suction force. When the apparatus which simultaneously performs delamination and adhesion processes according to one embodiment of the present invention is formed as described above, the second workpiece 500 may be prevented from being separated from the curved main body 210 and the first workpiece 400 adhered on the carrier substrate 300 may be delaminated from the carrier substrate 300 and stably adhered to the second workpiece 500 during the delamination and adhesion process.

Figure 11:
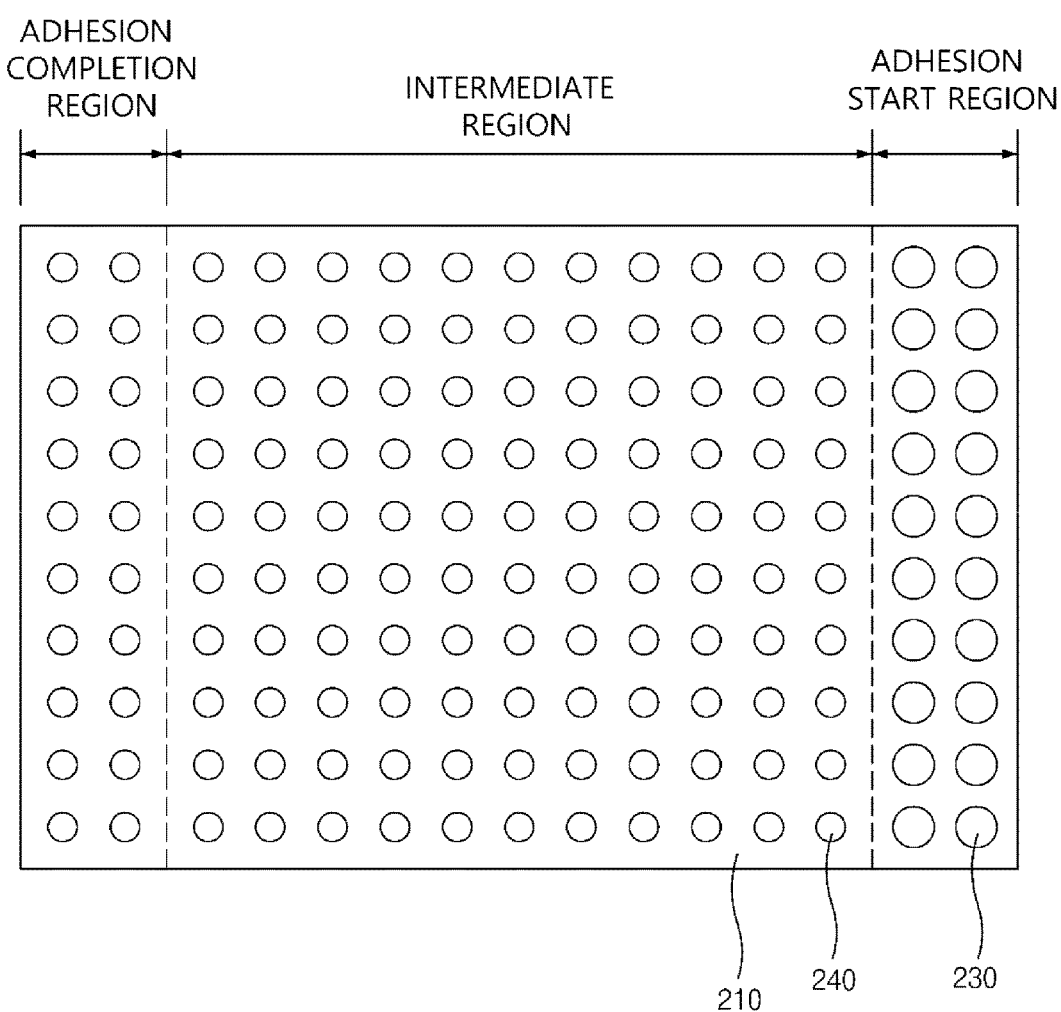
FIGS. 11 to 16 are views illustrating examples of configurations of upper stage holes formed in a curved main body forming an upper stage according to one embodiment of the present invention.

As one example, referring additionally to FIG. 11, the upper stage 200 may fix the second workpiece 500 to a curved surface of the curved main body 210 by suctioning the second workpiece 500 using the upper suction force provided through the upper stage holes 220 formed in the curved main body 210, and among the upper stage holes 220, each diameter of first upper stage holes 230 formed in an adhesion start region at which adhesion of the second workpiece 500 to the first workpiece 400 starts may be greater than that of second upper stage holes 240 formed in a region other than the adhesion start region. Through such a structure, the upper suction force provided through the adhesion start region may be relatively strong, and thus the first workpiece 400 located at a location corresponding to the adhesion start region may be stably delaminated from the carrier substrate 300. That is, as a delamination force provided at the region at which delamination starts is stronger than a delamination force provided at the region at which delamination progresses, the upper suction force applied to a narrow area may be strongly transferred to the first workpiece 400 at a moment at which the second workpiece 500 of the upper stage 200 comes into contact with the adhesion start region of the first workpiece 400, and thus the first workpiece 400 corresponding to the region at which delamination starts may be stably separated from the carrier substrate 300 without damaging an adhered portion thereof.

Various configurations may be used to adjust the upper suction force provided through the adhesion start region to be relatively stronger.

Figure 12:
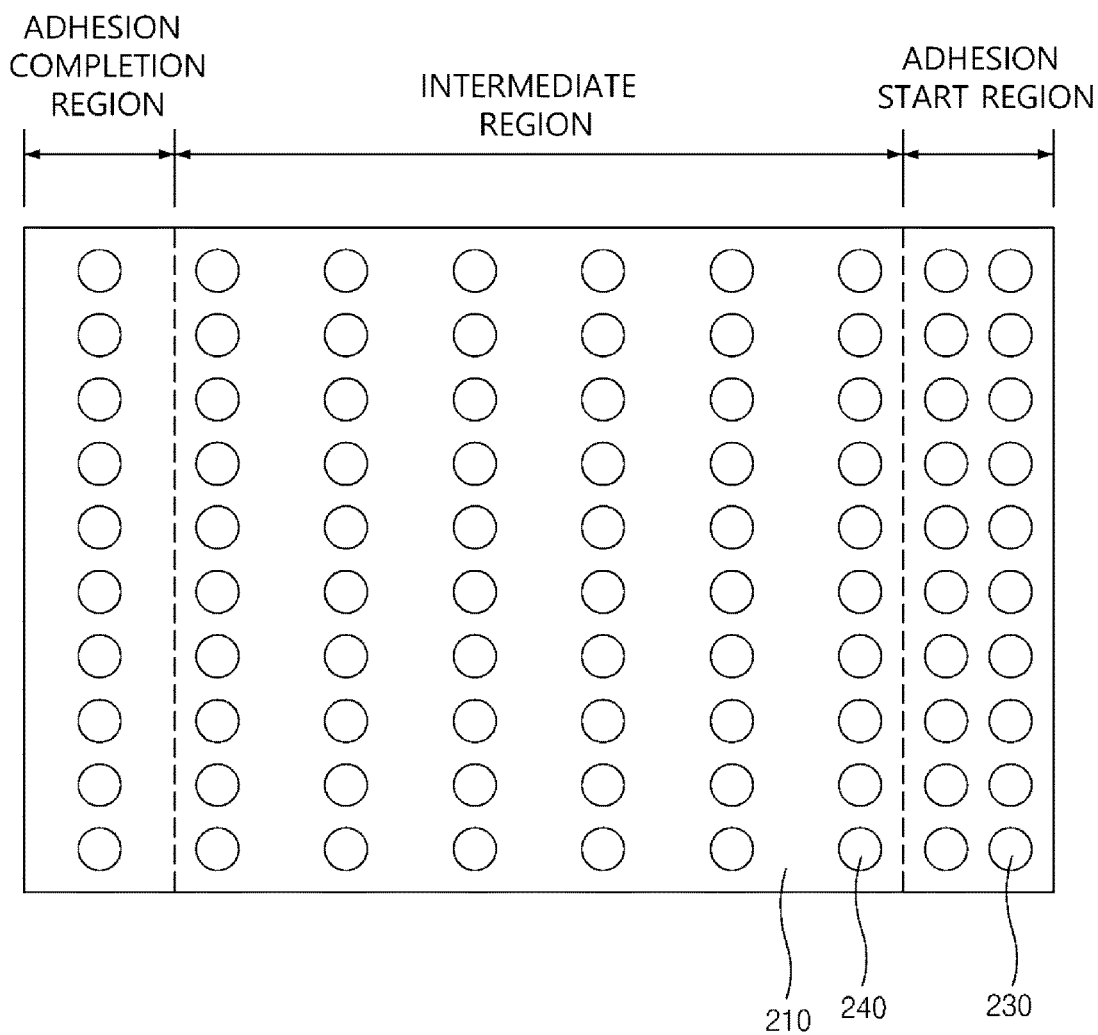

As another example, referring additionally to FIG. 12, the upper stage 200 may fix the second workpiece 500 to the surface of the curved main body 210 by suctioning the second workpiece 500 using the upper suction force provided through the upper stage holes 220 formed in the curved main body 210, and among the upper stage holes 220, a density of the first upper stage holes 230 formed in the adhesion start region at which the adhesion of the second workpiece 500 to the first workpiece 400 starts may be greater than that of the second upper stage holes 240 formed in the region other than the adhesion start region.

Figure 13:
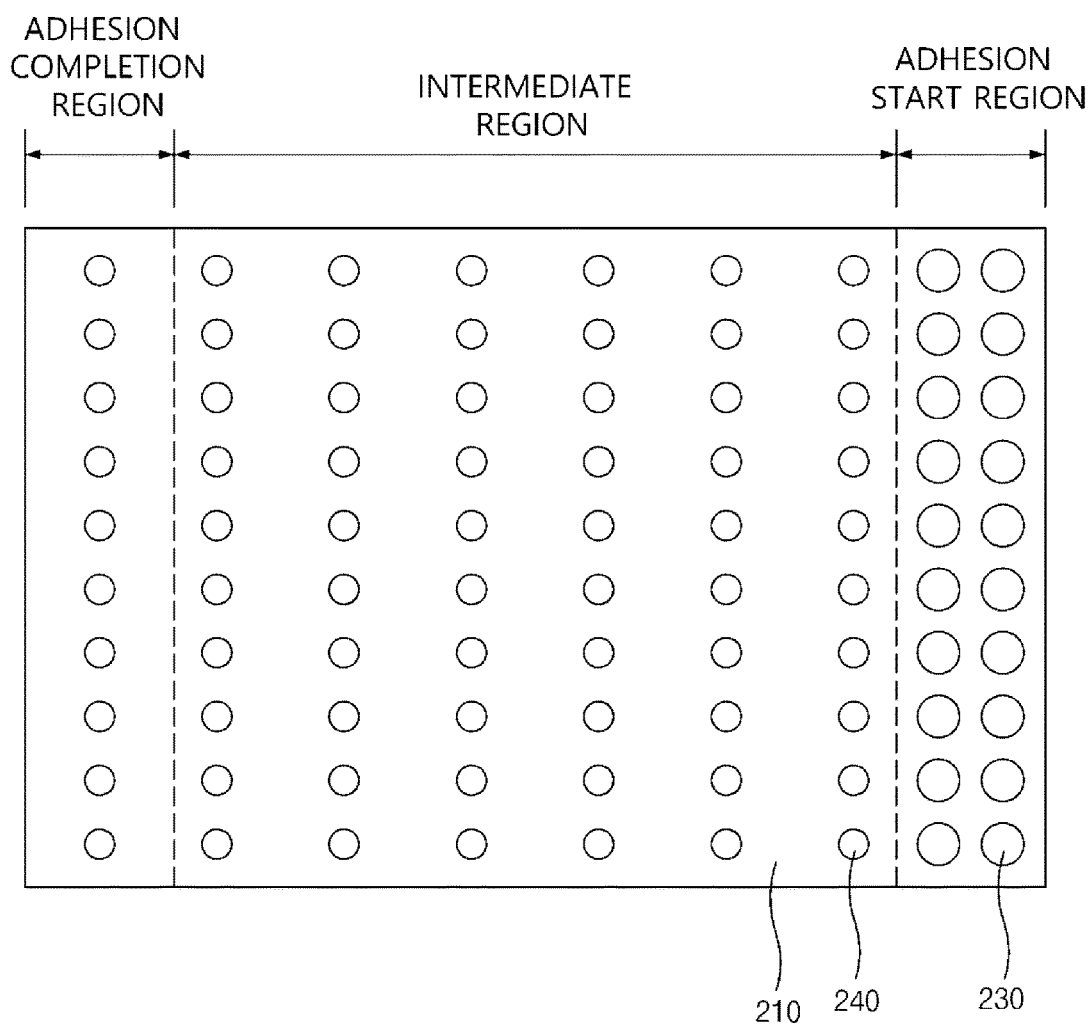

As still another example, referring additionally to FIG. 13, the upper stage 200 may fix the second workpiece 500 to the surface of the curved main body 210 by suctioning the second workpiece 500 using the upper suction force provided through the upper stage holes 220 formed in the curved main body 210, and among the upper stage holes 220, each diameter and the density of the first upper stage holes 230 formed in the adhesion start region at which adhesion of the second workpiece 500 to the first workpiece 400 starts may be greater than those of the second upper stage holes 240 formed in the region other than the adhesion start region.

Figure 14:
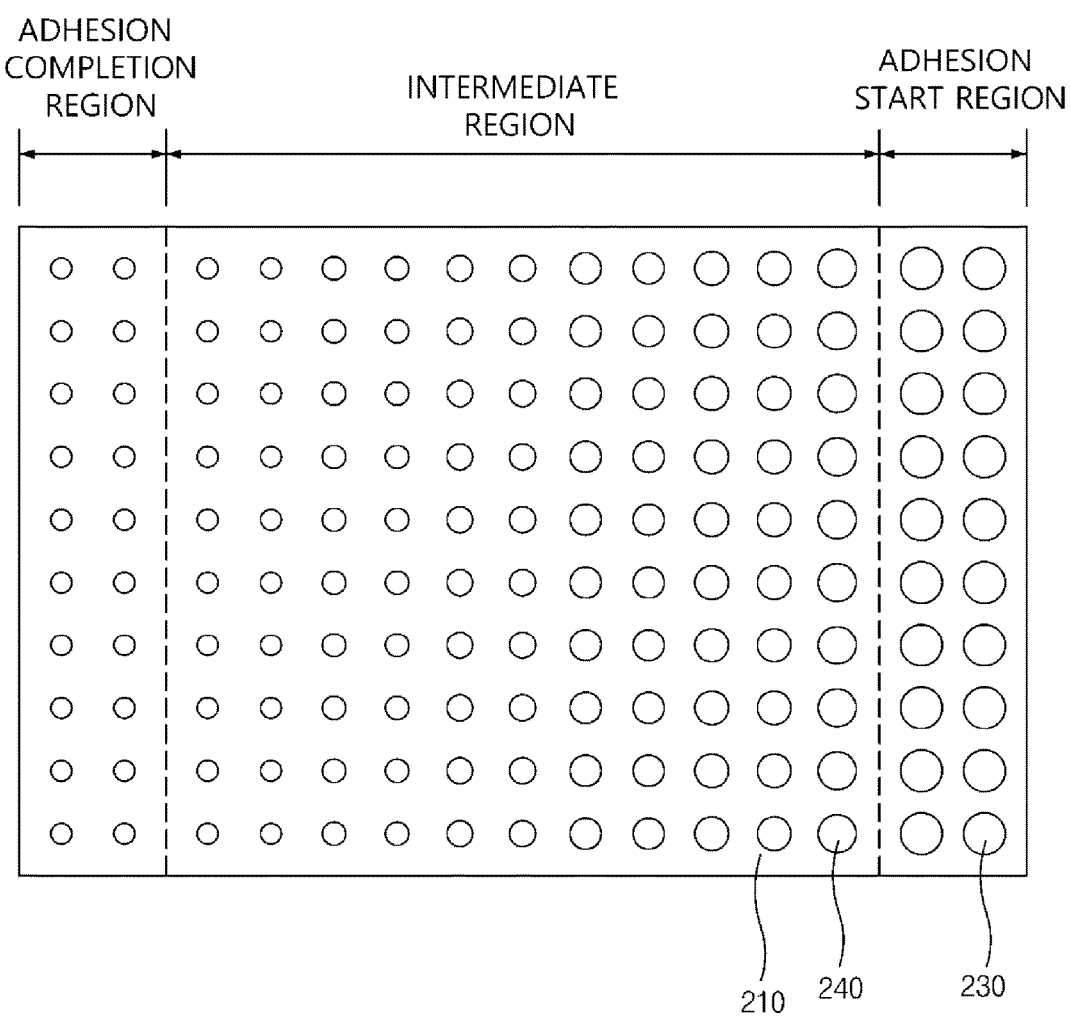

As yet another example, referring additionally to FIG. 14, the upper stage 200 may fix the second workpiece 500 to the surface of the curved main body 210 by suctioning the second workpiece 500 using the upper suction force provided through the upper stage holes 220 formed in the curved main body 210, diameters of the upper stage holes 220 decrease from the adhesion start region at which the adhesion of the second workpiece 500 to the first workpiece 400 starts to an adhesion completion region at which the adhesion of the second workpiece 500 to the first workpiece 400 is completed.

Figure 15:
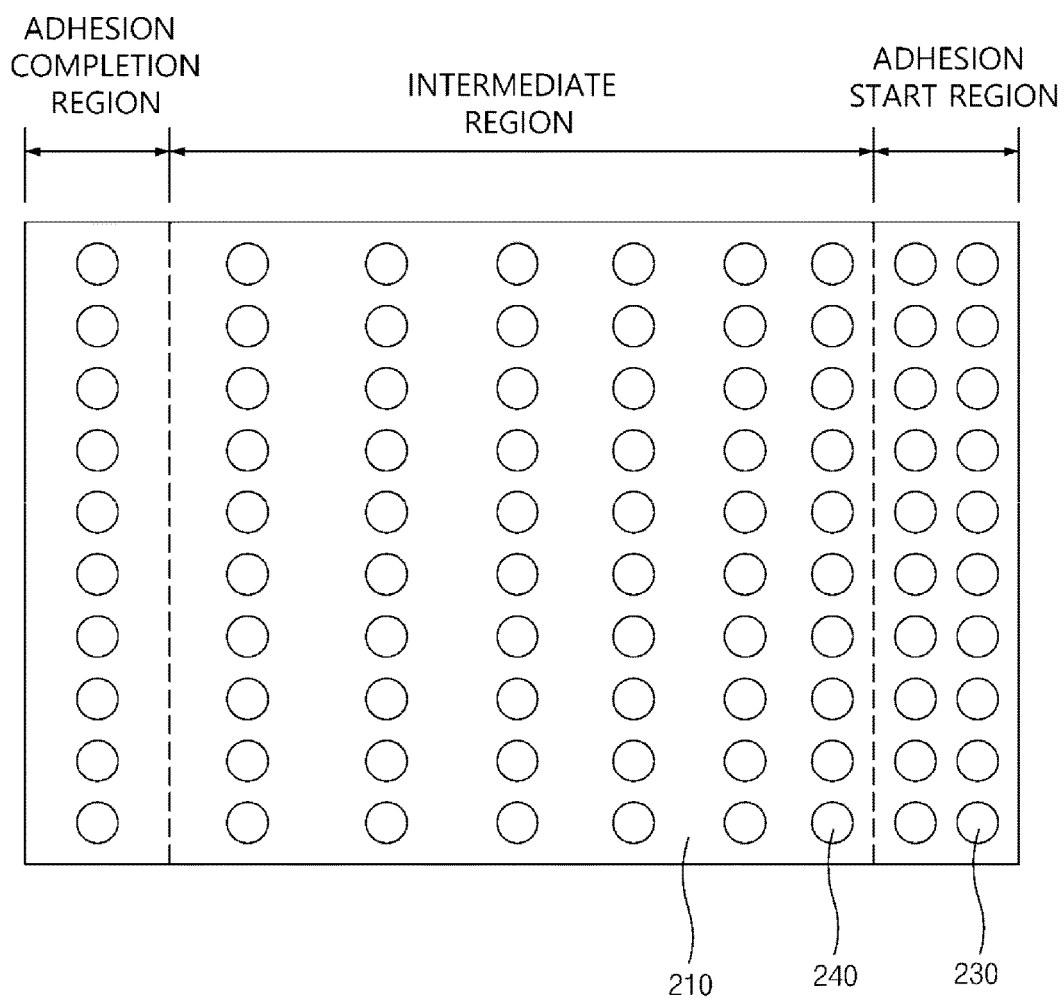

As yet another example, referring additionally to FIG. 15, the upper stage 200 may fix the second workpiece 500 to the surface of the curved main body 210 by suctioning the second workpiece 500 using the upper suction force provided through the upper stage holes 220 formed in the curved main body 210, densities of the upper stage holes 220 decrease from the adhesion start region at which the adhesion of the second workpiece 500 to the first workpiece 400 starts to the adhesion completion region at which the adhesion of the second workpiece 500 to the first workpiece 400 is completed.

Figure 16:
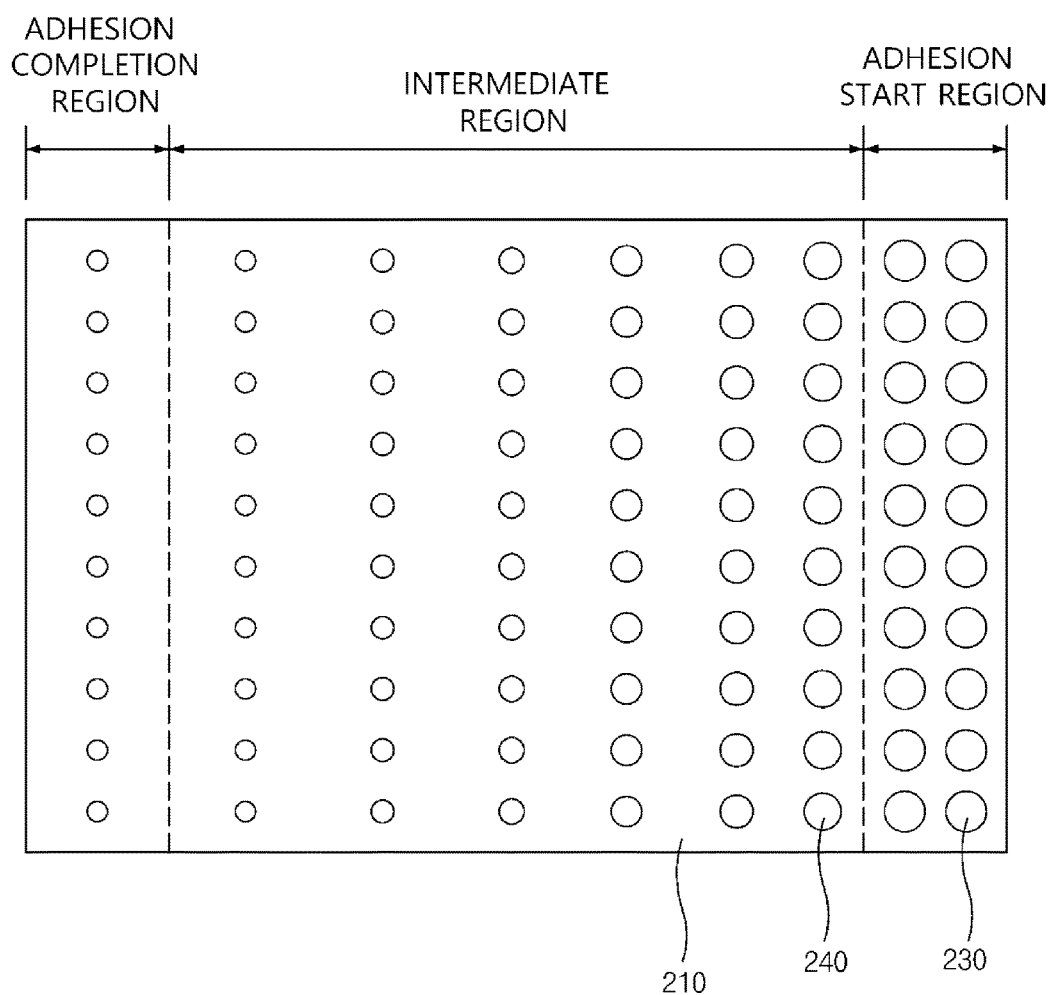

As yet another example, referring additionally to FIG. 16, the upper stage 200 may fix the second workpiece 500 to the surface of the curved main body 210 by suctioning the second workpiece 500 using the upper suction force provided through the upper stage holes 220 formed in the curved main body 210, diameters and densities of the upper stage holes 220 decrease from the adhesion start region at which the adhesion of the second workpiece 500 to the first workpiece 400 starts to the adhesion completion region at which the adhesion of the second workpiece 500 to the first workpiece 400 is completed.

Hereinafter, examples of detailed operations of the apparatus which simultaneously performs delamination and adhesion processes according to one embodiment of the present invention will be described with additional reference to FIGS. 5 to 10.

Figure 5:
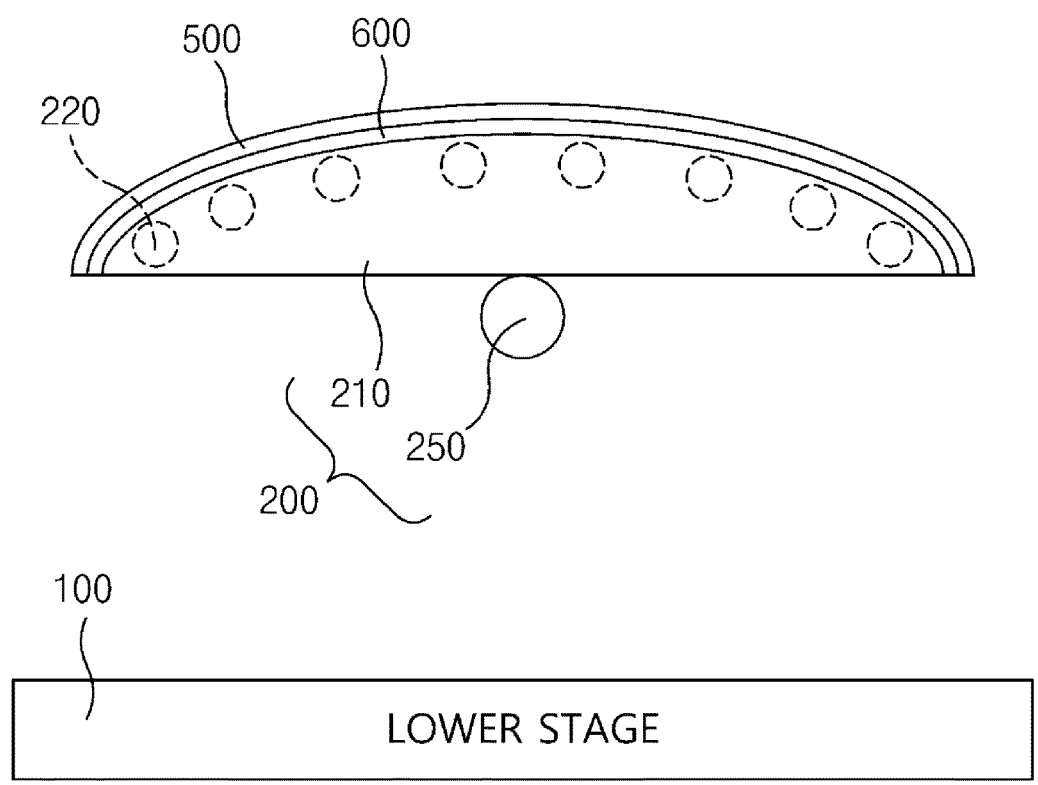
FIGS. 5 to 10 are views for describing examples of detailed operations of the apparatus which simultaneously performs delamination and adhesion processes according to one embodiment of the present invention.

Referring additionally to FIG. 5, a process of seating the second workpiece 500 on the curved surface of the curved main body 210 forming the upper stage 200 is performed. For example, the process may be performed by providing the upper suction force to the upper stage holes 220 formed in the curved main body 210 such that the second workpiece 500 is suctioned and fixed to the curved surface of the curved main body 210.

Figure 6:
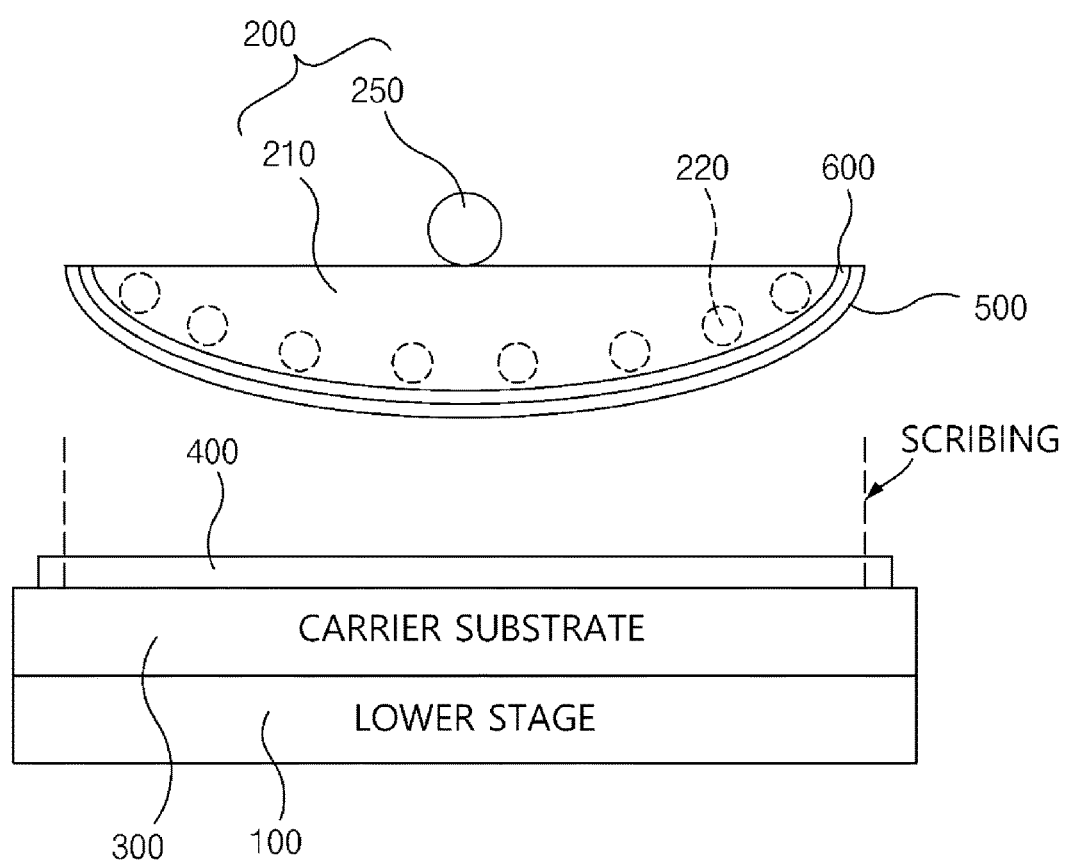

Referring additionally to FIG. 6, a process in which the carrier substrate 300 on which the first workpiece 400 is adhered is seated on the lower stage 100 and at least one of the upper stage 200 and the lower stage 100 is moved to align the upper stage 200 with the lower stage 100 is performed for the delamination and adhesion process. For example, the process of seating the carrier substrate 300 on the lower stage 100 may be performed by providing the lower suction force to the lower stage holes 120 formed in the lower stage 100 to suction the carrier substrate 300 on which the first workpiece 400 is adhered and fix the carrier substrate 300 to the lower stage 100. For example, a prescribing process may be performed at four corner regions of the first workpiece 400 on which the delamination and adhesion process is performed and which is seated on the lower stage 100 so that the first workpiece 400 is easily delaminated from the carrier substrate 300.

Figure 7:
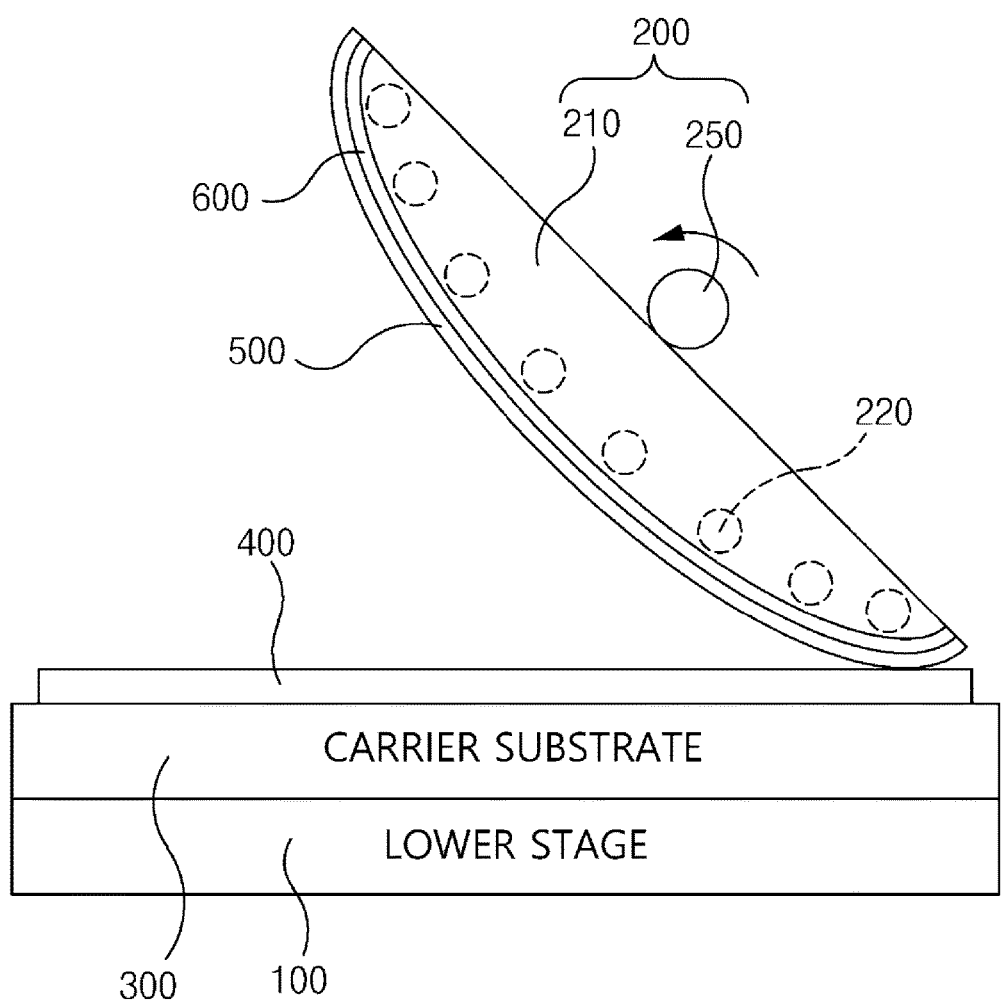
Figure 8:
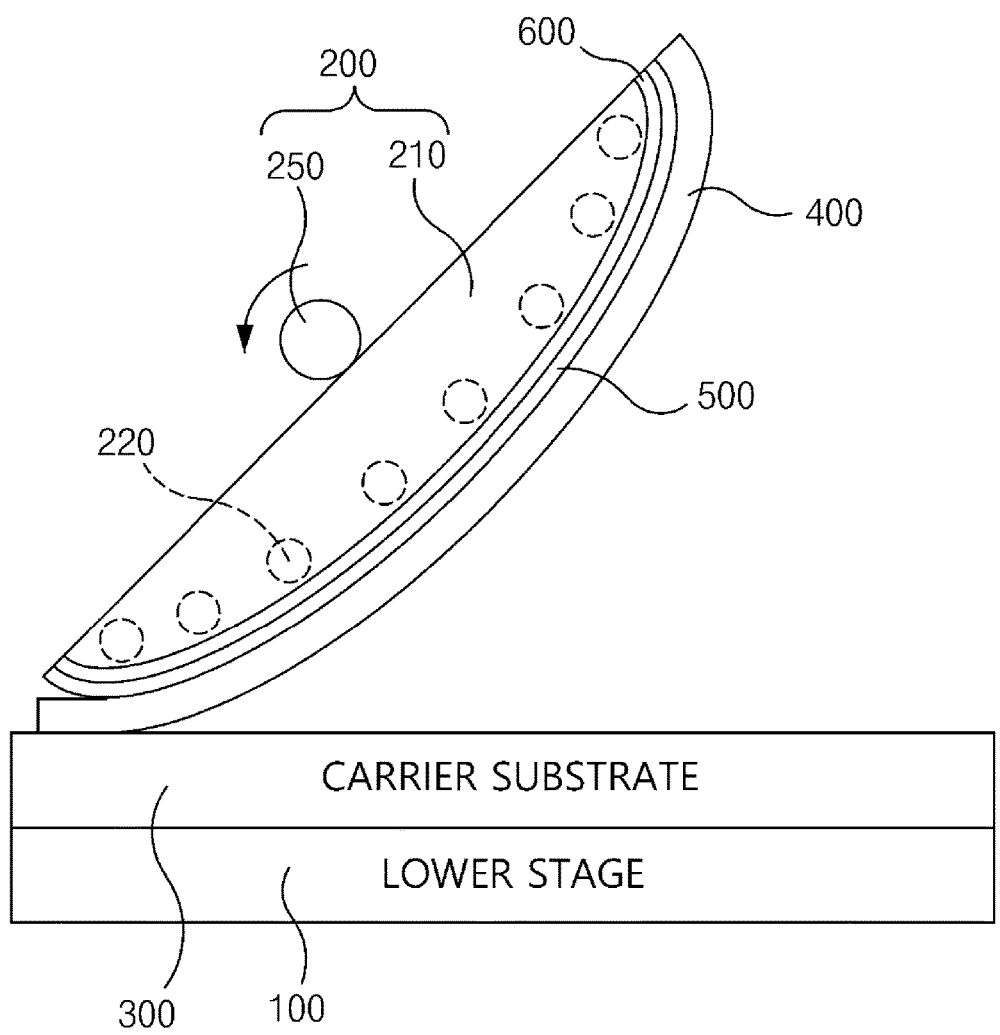

Referring additionally to FIGS. 7 and 8, as the driving portion 250 of the upper stage 200 rotates the curved main body 210 such that portions of the second workpiece 500 suctioned on the curved surface of the curved main body 210 sequentially presses corresponding portions of the first workpiece 400 adhered on the carrier substrate 300, a process in which the second workpiece 500 is adhered to the first workpiece 400 at the same time that the first workpiece 400 is delaminated from the carrier substrate 300 is performed.

Figure 9:
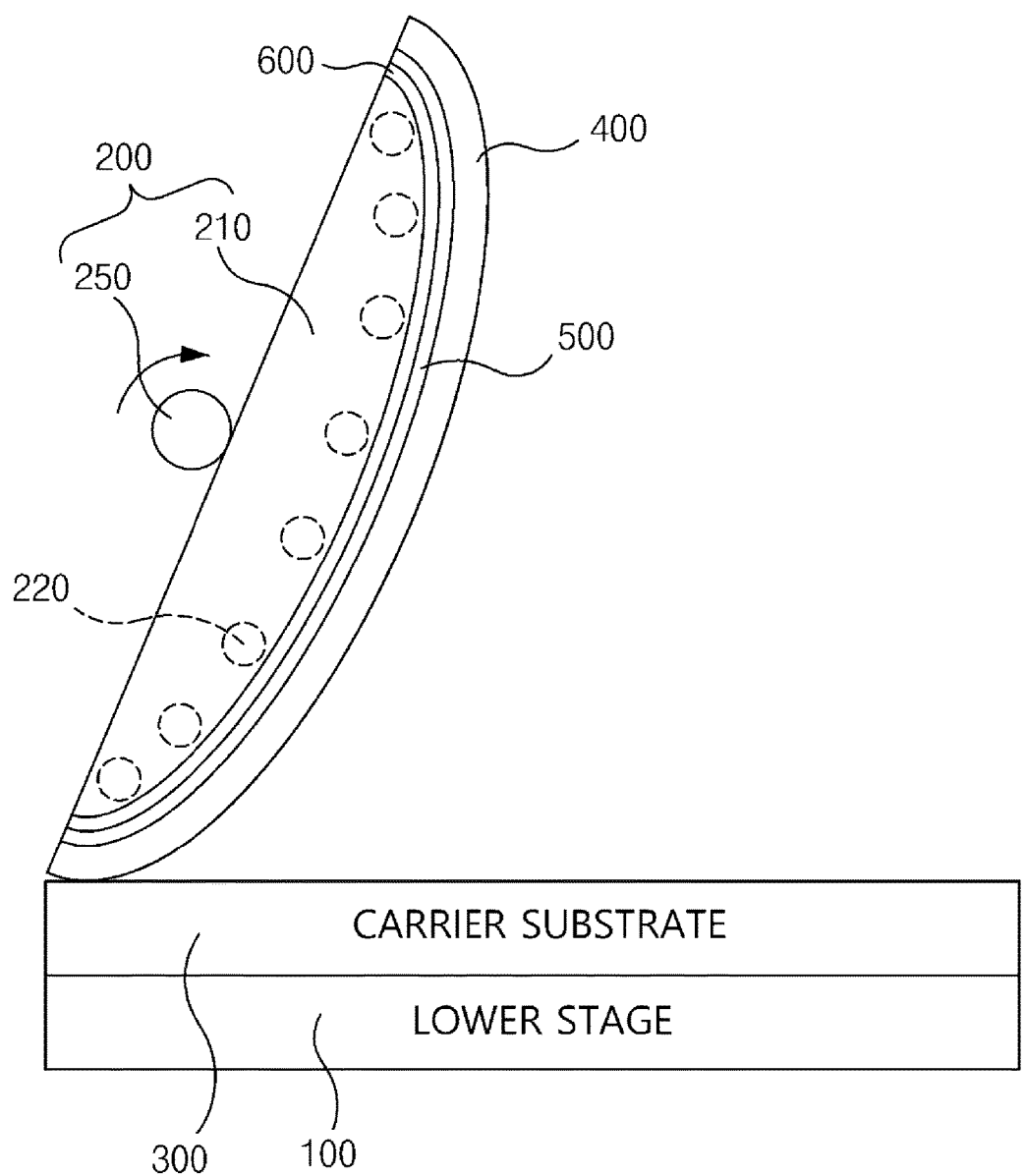
Figure 10:
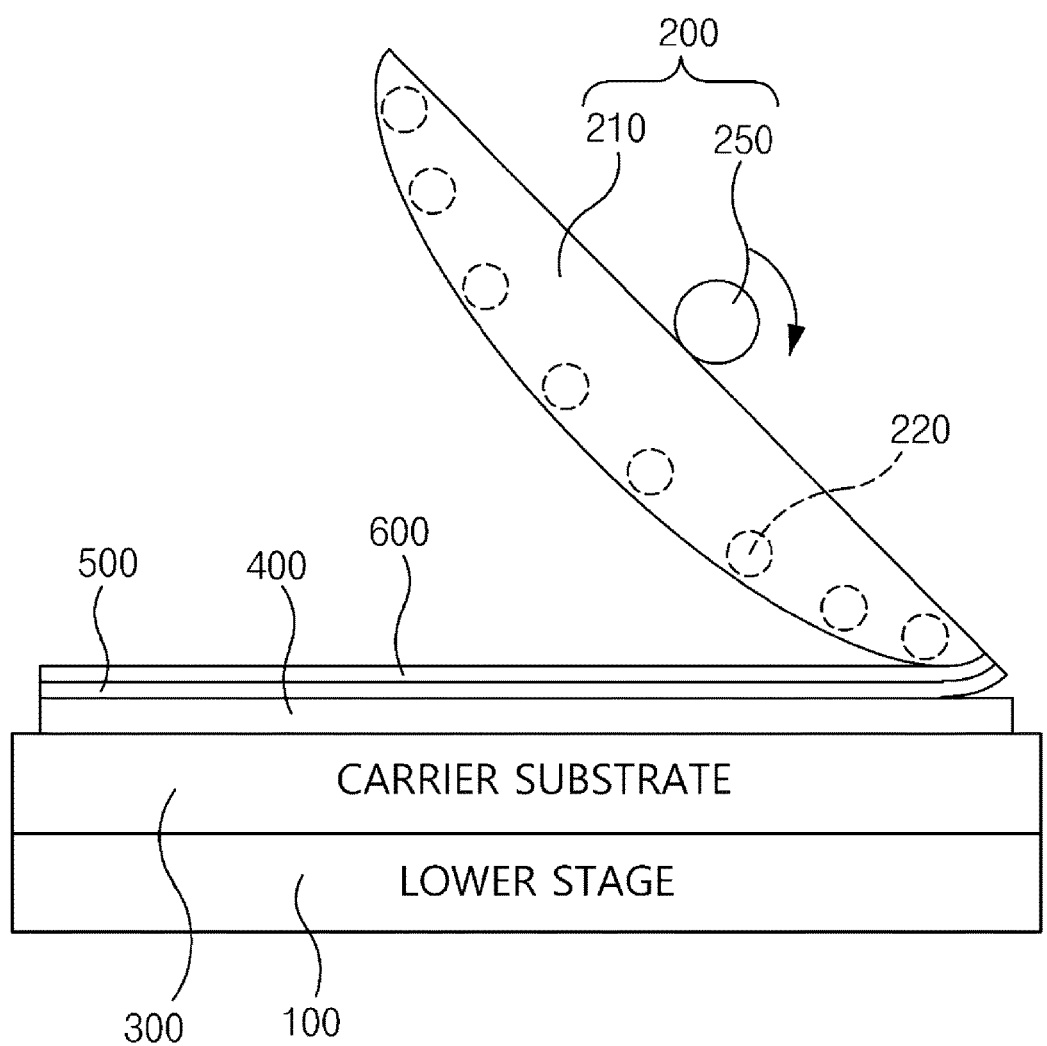

Referring additionally to FIG. 9 and FIG. 10, immediately after an adhered laminate including the first workpiece 400 and the second workpiece 500 is adsorbed on the curved surface of the curved main body 210, a process in which the curved main body 210 is rotated in a direction opposite a direction of the adhesion process such that the adhered laminate sequentially comes into contact with the carrier substrate 300 at a predetermined pressure at the same time that an adsorption force of the curved shaped surface is decreased to stack the adhered laminate on the carrier substrate 300 is performed.

That is, in FIGS. 9 and 10, two processes of transferring the laminate, which includes the first workpiece 400 and the second workpiece 500, is formed by delaminating the first workpiece 400 from the carrier substrate 300 and adhering the delaminated first workpiece 400 to the second workpiece 500, and is stacked on the curved surface of the curved main body 210 of the upper stage 200, to the lower stage 100 may be performed sequentially as described with reference to FIGS. 5 to 8. Here, a suction force between the upper stage 200 and the flexible substrate 600 may be weaker than an adhesive force between the first workpiece 400 and the carrier substrate 300 from the adhesion completion region of the upper stage 200 such that the laminate is easily delaminated from the upper stage 200.

Next Table 1 shows a result of an experiment using a conventional method related to delamination and adhesion processes and the apparatus which simultaneously performs delamination and adhesion processes according to one embodiment of the present invention.

In this experiment, the second workpiece 500 was an OCA film, a pressing pressure was a pressure at which the upper stage 200 moved downward, that is, a pressure at which the second workpiece 500 seated on the curved main body 210 pressed the first workpiece 400 adhered on the carrier substrate 300, a TD contraction rate was a contraction rate in a direction perpendicular to the direction in which the delamination and adhesion process was performed, and an MD contraction rate was a contraction rate in the direction in which the delamination and adhesion process was performed.

TABLE 1

| | OCA thickness (μm) | Upper suction Force (kPa) | Lower suction force (kPa) | Lowering pressure (N) | Delamination capability | TD contraction rate (μm/mm) | MD contraction rate (μm/mm) |
|---|---|---|---|---|---|---|---|
| Comparative Example | 20 | — | — | — | Good | 0.360 | 0.230 |
| Example 1 | 20 | 20 | 10 | 0.3 | Bad | — | — |
| Example 2 | 20 | 40 | 10 | 0.3 | Bad | — | — |
| Example 3 | 20 | 60 | 30 | 0.3 | Good | 0.028 | 0.020 |
| Example 4 | 20 | 60 | 50 | 0.3 | Good | 0.015 | 0.011 |
| Example 5 | 20 | 100 | 50 | 0.3 | Good | 0.008 | 0.006 |
| Example 6 | 60 | 60 | 30 | 0.3 | Medium | 0.012 | 0.011 |
| Example 7 | 60 | 60 | 30 | 0.5 | Good | 0.009 | 0.008 |
| Example 8 | 100 | 60 | 30 | 0.5 | Medium | 0.015 | 0.012 |
| Example 9 | 100 | 60 | 30 | 0.8 | Good | 0.019 | 0.015 |

Figure 17:
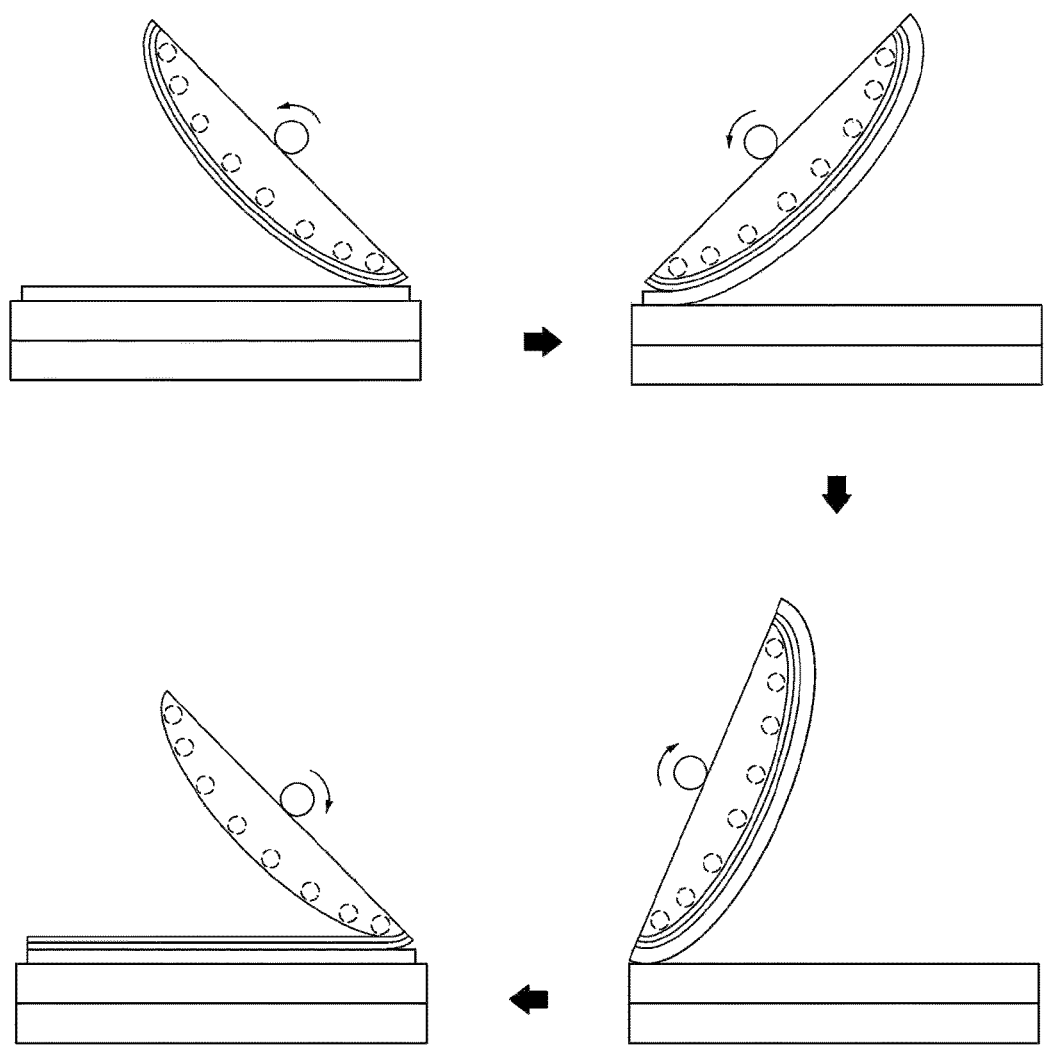
FIG. 17 is a view illustrating a method of simultaneously performing delamination and adhesion processes according to one embodiment of the present invention.

FIG. 17 is a view illustrating a method of simultaneously performing delamination and adhesion processes according to one embodiment of the present invention and including the processes illustrated in FIGS. 7 to 10.

Referring to FIGS. 7 to 10 and 17, the method of simultaneously performing delamination and adhesion processes according to one embodiment of the present invention includes rotating the curved main body 210 by the driving portion 250 of the upper stage 200 such that predetermined portions of the second workpiece 500 suctioned on a curved surface of the curved main body 210 sequentially come into contact with and press corresponding predetermined portions of the first workpiece 400 adhered on the carrier substrate 300 at a predetermined pressure to simultaneously adhere the second workpiece 500 to the first workpiece 400 and delaminate the first workpiece 400 from the carrier substrate 300, and rotating the curved main body 210 in a direction opposite a direction of the adhesion process such that an adhered laminate including the first workpiece 400 and the second workpiece 500 sequentially comes into contact with the carrier substrate 300 at a predetermined pressure at the same time that an adsorption force of the curved surface is decreased to stack the adhered laminate on the carrier substrate 300 immediately after the adhered laminate is adsorbed on the curved surface of the curved main body 210.

Although detailed descriptions related to the method have been omitted to avoid duplication of the descriptions related to the apparatus, the above-described descriptions of the apparatus which simultaneously performs delamination and adhesion processes according to one embodiment of the present invention may also be applied to corresponding portions of the method of simultaneously performing delamination and adhesion processes according to one embodiment of the present invention.

According to the present invention described in detail above, there are effects of providing an apparatus and a method for simultaneously performing delamination and adhesion processes, which are capable of decreasing the required number of detailed processes and a process time and increasing a yield in comparison to a conventional method of separately performing the adhesion and delamination processes by simultaneously performing the adhesion and delamination processes.

In addition, there is an effect of proving an apparatus and a method for simultaneously performing delamination and adhesion processes, which are capable of minimizing deformation of a workpiece due to a residual stress generated during the adhesion and delamination processes.

Specifically, in a case in which an adhesion process is performed using a conventional roller, since a workpiece on a substrate does not have a tension but a workpiece which will be adhered to the workpiece on the substrate and is adhered to a roller has a tension until a moment at which the workpiece is adhered to the workpiece on the substrate, the workpieces have different residual stresses around finally adhered surfaces thereof, and thus the workpieces are deformed like a film even in a state in which there are no external forces. However, according to the present invention, a workpiece can be adhered to a workpiece to be adhered thereto in a state in which the workpiece is fixed to a stage having a predetermined form such that such a tension difference does not occur.

In addition, there is an effect of decreasing the number of processes by stacking a laminate on a carrier substrate such that the laminate can be moved without an additional separation process immediately after an adhesion process.

DESCRIPTION OF SYMBOLS

100: lower stage
120: lower stage holes
200: upper stage
210: curved main body
220: upper stage holes
230: first upper stage holes
240: second upper stage holes
250: driving portion
300: carrier substrate
400: first workpiece
500: second workpiece
600: flexible substrate

The invention claimed is:

1. An apparatus for simultaneously performing delamination and adhesion processes, comprising:
    a lower stage configured to suction and fix a carrier substrate on which a first workpiece is adhered; and
    an upper stage including a curved main body configured to suction and fix a second workpiece and formed in a shape convex toward the first workpiece, and a driving portion configured to rotate the curved main body such that predetermined portions of the second workpiece sequentially come into contact with corresponding predetermined portions of the first workpiece at a predetermined pressure, adhere the second workpiece to the first workpiece, and delaminate the first workpiece from the carrier substrate during an adhesion process,
    wherein the upper stage suctions the second workpiece using the upper suction force, which is provided through upper stage holes formed in the curved main body, and fixes the second workpiece on the curved surface of the curved main body; and
    each diameter of upper stage holes in an adhesion start region at which adhesion of the second workpiece to the first workpiece starts is greater than that of upper stage holes in an adhesion completion region at which the adhesion of the second workpiece to the first workpiece is completed.

2. The apparatus of claim 1, wherein the upper suction force is stronger than an adhesion between the carrier substrate and the first workpiece.

3. The apparatus of claim 1, wherein:
    the first workpiece includes a color filter; and
    the second workpiece includes a protective film.

4. The apparatus of claim 3, wherein the second workpiece includes an optically clear adhesive (OCA) film.

5. The apparatus of claim 3, wherein the second workpiece is formed on a flexible substrate having ductility or a glass substrate.

6. The apparatus of claim 1, wherein a pre-scribing process is performed on four corner regions of the first workpiece which is adhered on the carrier substrate and is a target of delamination and adhesion processes.

7. A method of simultaneously performing delamination and adhesion processes, comprising:
    rotating a curved main body by a driving portion of an upper stage such that predetermined portions of a second workpiece suctioned on a curved surface of the curved main body sequentially come into contact with and press corresponding predetermined portions of a first workpiece adhered on a carrier substrate at a predetermined pressure to simultaneously adhere the second workpiece to the first workpiece and delaminate the first workpiece from the carrier substrate; and
    rotating the curved main body in a direction opposite a rotational direction of the curved main body during an adhesion process such that an adhered laminate including the first workpiece and the second workpiece sequentially comes into contact with the carrier substrate at a predetermined pressure at the same time that an adsorption force of the curved surface is decreased to stack the adhered laminate on the carrier substrate immediately after the adhered laminate is adsorbed on the curved surface of the curved main body,
    wherein an upper suction force by which the upper stage suctions the second workpiece is stronger than a lower suction force by which the lower stage suctions the first workpiece, at least one of the first workpiece and the second workpiece includes a surface having an adhesive force and located opposite a suction surface, and the upper suction force and the lower suction force are weaker than an adhesive force between the first workpiece and the second workpiece.

8. An apparatus for simultaneously performing delamination and adhesion processes, comprising:
    a lower stage configured to suction and fix a carrier substrate on which a first workpiece is adhered; and
    an upper stage including a curved main body configured to suction and fix a second workpiece and formed in a shape convex toward the first workpiece, and a driving portion configured to rotate the curved main body such that predetermined portions of the second workpiece sequentially come into contact with corresponding predetermined portions of the first workpiece at a predetermined pressure, adhere the second workpiece to the first workpiece, and delaminate the first workpiece from the carrier substrate during an adhesion process, wherein the upper stage suctions the second workpiece using the upper suction force, which is provided through upper stage holes formed in the curved main body, and fixes the second workpiece on the curved surface of the curved main body; and a density of upper stage holes in an adhesion start region at which adhesion of the second workpiece to the first workpiece starts is greater than that of upper stage holes in an adhesion completion region at which the adhesion of the second workpiece to the first workpiece is completed.

9. An apparatus for simultaneously performing delamination and adhesion processes, comprising:

a lower stage configured to suction and fix a carrier substrate on which a first workpiece is adhered; and an upper stage including a curved main body configured to suction and fix a second workpiece and formed in a shape convex toward the first workpiece, and a driving portion configured to rotate the curved main body such that predetermined portions of the second workpiece sequentially come into contact with corresponding predetermined portions of the first workpiece at a predetermined pressure, adhere the second workpiece to the first workpiece, and delaminate the first workpiece from the carrier substrate during an adhesion process, wherein the upper stage suctions the second workpiece using the upper suction force, which is provided through upper stage holes formed in the curved main body, and fixes the second workpiece on the curved surface of the curved main body; and each diameter or a density of upper stage holes in an adhesion start region at which adhesion of the second workpiece to the first workpiece starts is greater than that of upper stage holes in an adhesion completion region at which the adhesion of the second workpiece to the first workpiece is completed.

* * * * *